US008032779B2

(12) United States Patent
Clemm et al.

(10) Patent No.: US 8,032,779 B2
(45) Date of Patent: Oct. 4, 2011

(54) ADAPTIVELY COLLECTING NETWORK EVENT FORENSIC DATA

(75) Inventors: L. Alexander Clemm, Los Gatos, CA (US); Carlos M. Pignataro, Raleigh, NC (US); Rodney S. Dunn, Benson, NC (US); Steve Chen-Lin Chang, Cupertino, CA (US); Shyyunn Sheran Lin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 149 days.

(21) Appl. No.: 12/551,143

(22) Filed: Aug. 31, 2009

(65) Prior Publication Data

US 2011/0055637 A1 Mar. 3, 2011

(51) Int. Cl.
*G06F 11/00* (2006.01)
(52) U.S. Cl. ............... 714/4.1; 714/4.4; 714/45; 714/48
(58) Field of Classification Search .................. None
See application file for complete search history.

(56) References Cited

U.S. PATENT DOCUMENTS

| | | | | |
|---|---|---|---|---|
| 6,327,677 B1 * | 12/2001 | Garg et al. | ...................... | 714/37 |
| 7,343,529 B1 * | 3/2008 | Klinkner et al. | ................ | 714/57 |
| 7,668,953 B1 * | 2/2010 | Sinclair et al. | ................ | 709/224 |
| 7,752,504 B2 * | 7/2010 | Chang et al. | ..................... | 714/48 |
| 2003/0154402 A1 * | 8/2003 | Pandit et al. | .................. | 713/201 |
| 2008/0301506 A1 * | 12/2008 | Chang et al. | ..................... | 714/57 |
| 2010/0211826 A1 * | 8/2010 | Villella et al. | .................. | 714/39 |

* cited by examiner

*Primary Examiner* — Christopher McCarthy
(74) *Attorney, Agent, or Firm* — Hickman Palermo Truong & Becker LLP

(57) ABSTRACT

In an embodiment, a data processing system comprises a repository configured to store a plurality of event message definitions for error messages, syslog messages, or other notification messages that may be emitted by one or more managed network elements; event annotation logic coupled to the data repository and configured to receive and store one or more annotations to each of the event message definitions, wherein each of the annotations specifies event context information to be collected in the managed network elements when an associated event message occurs; event forensics definitions generator logic coupled to the event annotation logic and configured to generate an event forensics definitions file capable of interpretation by one or more managed network elements and comprising event type identifiers and context information identifiers for context information to be collected, and configured to cause distributing the event forensics definitions file to the one or more managed network elements.

20 Claims, 4 Drawing Sheets

ADAPTIVELY COLLECTING NETWORK EVENT FORENSIC DATA

TECHNICAL FIELD

The present disclosure generally relates to network management. The disclosure relates more specifically to techniques for collecting data about network events occurring at managed network elements such as routers and switches in a packet-switched network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Problems in data communication networks generally lead network devices (such as routers and switches) generating event messages. Often, the event messages refer to symptoms rather than root causes, and in many cases the significance of an event is not immediately recognized at a network management computer or through review by a human analyst. At the same time, many events contain only limited information about context in which they occur. Such context can include information about certain state or even statistical information at the time of event occurrence, such as current link or CPU utilization. Context information is fleeting, and by the time an external application, or user, or support staff decides to issue a query, it may already have been lost. Context information may be different for different event messages, so that each particular event or event type is associated with a different interesting and unique context. The information that is relevant and needed is often specific to the event, operational environment, heuristics that are applied by a particular operator, and/or the network deployment; in many cases it is not known a priori what that information is; instead, it is the result of operational experience that is gained over time.

Thus, collecting timely and relevant information about network events has been a difficult task in past practice, and past attempts to address the problem have been inadequate. For example, network devices can be programmed with scripts that can be executed on the device, triggered by certain events. The Package Distribution System allows to dynamically distribute and to install packages containing data files (for data driven systems) or even entire applications. SUT (Syslog Usability Tool) maintains information about system messages, message definitions, and facilitates system message definition development. SUT allows users to provide additional information about messages that improve their documentation and over time help build a knowledge base.

However, even these components provide no practical way for a user to dynamically customize, over time, the context information that is to be collected in a timely manner for events within a device or across the network. Historically heavy system, or network, administration tasks have been required, involving writing scripts and managing their installation and activation across the network. Further, the learning of one user about what constitutes interesting context in a given situation has been difficult to benefit another user.

DETAILED DESCRIPTION

Figure 1:
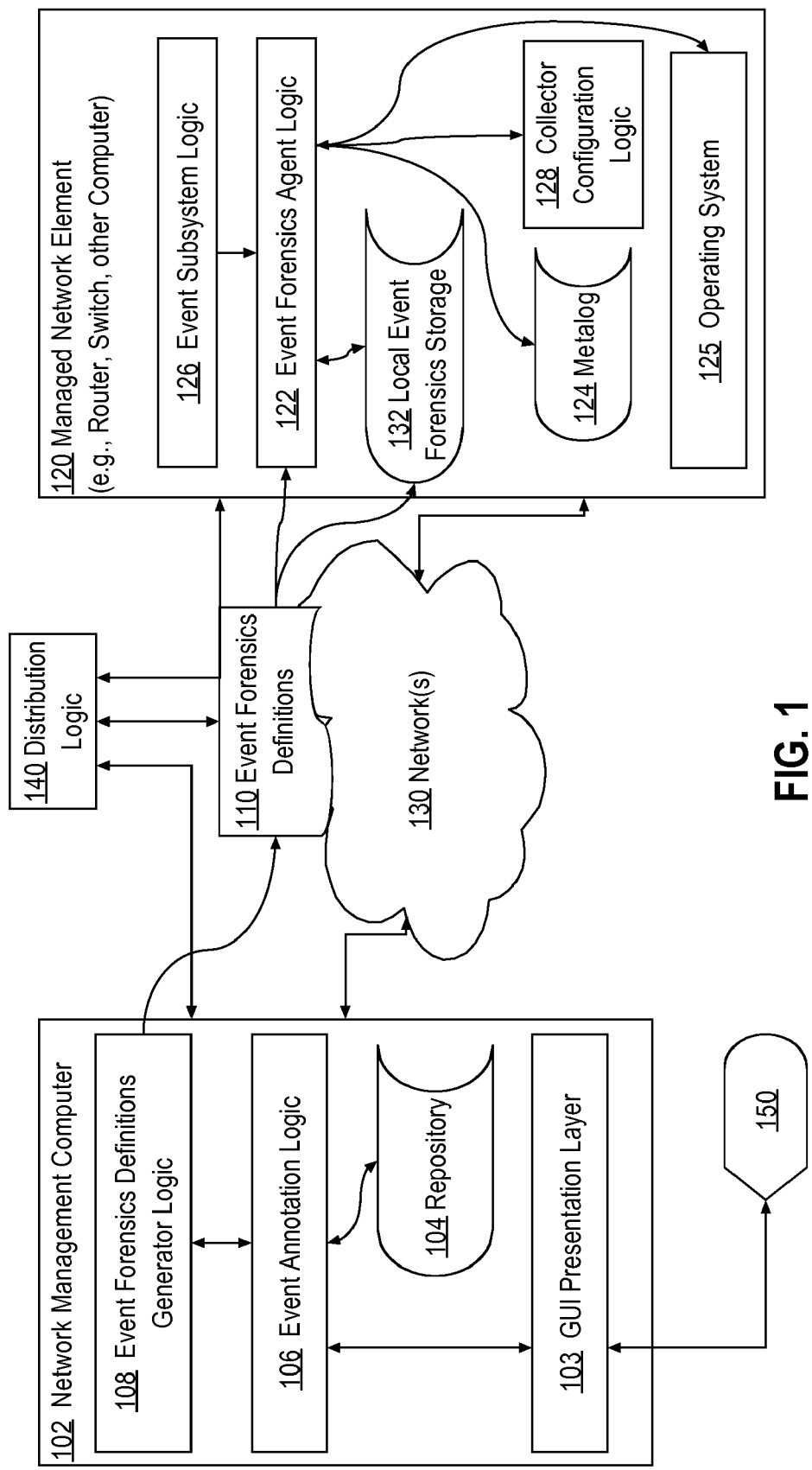
FIG. 1 illustrates a networking system in which an embodiment may be used.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives 1.0 General Overview In an embodiment, a data processing system comprises a data repository configured to store a plurality of event message definitions for error messages, syslog messages, or other notification messages that may be emitted by one or more managed network elements; event annotation logic coupled to the data repository and configured to receive and store one or more annotations to each of the event message definitions or to a grouping of message definitions, wherein each of the annotations specifies event context information to be collected in the managed network elements when an associated event message occurs; event forensics definitions generator logic coupled to the event annotation logic and configured to generate an event forensics definitions file capable of interpretation by one or more managed network elements and comprising event type identifiers and context information identifiers for context information to be collected, and configured to cause distributing the event forensics definitions file to the one or more managed network elements.

As further described, the annotations can change over time. For example, an existing event forensics definitions file can be replaced dynamically. Event type identifiers may include XML data conforming to an XML data model or XMLPI data.

In an embodiment, the system further comprises, in each of the managed network elements, local event forensics storage configured to receive and store the event forensics definitions file; an event subsystem configured to detect creation of a particular event message, and in response to the detecting, immediately thereafter: to determine whether the event forensics definitions file defines event context information for that particular event message, and in response, to invoke event forensics agent logic to cause collecting the specified context information and to store the specified context information at the managed network element.

In an embodiment, the event forensics agent logic is configured to store the specified context information in a circular metalog at the managed network element. In an embodiment, the context information identifiers comprise any of command-line interface (CLI) commands, operating system function names, simple network management protocol (SNMP) management information base (MIB) object identifiers, and XML data conforming to an XML data model. In an embodiment, the event forensics agent logic is configured to initiate re-configuration of the managed network element for collection of the context information.

In an embodiment, a computer-implemented method comprises receiving and storing one or more event message definitions for error messages, syslog messages, or other notification messages that may be emitted by one or more managed network elements; receiving and storing one or more annotations to each of the event message definitions, wherein each of the annotations specifies event context information to be collected in the managed network elements when an associated event message occurs; automatically generating, in response to the storing the one or more annotations, an event forensics definitions file capable of interpretation by one or more managed network elements and comprising event type identifiers and context information identifiers for context information to be collected; causing distributing the event forensics definitions file to the one or more managed network elements.

In an embodiment, the method further comprises, at a managed network element: receiving and storing the event forensics definitions file; detecting creation of a particular event message; in response to the detecting, immediately thereafter: determining whether the event forensics definitions file defines event context information for that particular event message; in response to the determining, causing collecting the specified context information and storing the specified context information at the managed network element.

In an embodiment, a computer-readable storage medium stores one or more sequences of instructions which when executed by one or more processors, cause the one or more processors to perform receiving and storing one or more event message definitions for error messages, syslog messages, or other notification messages that may be emitted by one or more managed network elements; receiving and storing one or more annotations to each of the event message definitions, wherein each of the annotations specifies event context information to be collected in the managed network elements when an associated event message occurs; automatically generating, in response to the storing the one or more annotations, an event forensics definitions file capable of interpretation by one or more managed network elements and comprising event type identifiers and context information identifiers for context information to be collected; causing distributing the event forensics definitions file to the one or more managed network elements.

In an embodiment, the computer-readable storage medium further comprises instructions which when executed at a managed network element cause receiving and storing the event forensics definitions file; detecting creation of a particular event message; in response to the detecting, immediately thereafter: determining whether the event forensics definitions file defines event context information for that particular event message; in response to the determining, causing collecting the specified context information and storing the specified context information at the managed network element.

2.0 Structural and Functional Overview

In an embodiment, a networking system is configured to permit end users to provide, enhance, update or correct annotations or other information about what context information they would like to have collected along with certain network events, when those events occur, and automatically starts collecting this information in metalogs across the network whenever those events occur. In one implementations, end users create new annotations. Additionally or alternatively, a vendor of a network device could provide pre-defined or built-in annotations and an end user can modify the annotations to enhance, update or correct them.

In this context, end users may include network administrators, technicians, managers, or any other personnel involved in operating or supervising operation of a network management computer.

A network event is a message communicated from a networking device, such as a router or switch, to a network management computer and containing information about an exception, error, system message, threshold crossing, or other operational occurrence detected by or occurring in the networking device.

A metalog is a log about a syslog, in which each log record contains the near-real time context information that is to be collected and with a reference to the event that the context information is for.

In an embodiment, different annotations or context information may be stored for different events. Further, multiple different kinds of information may be specified for collection for a particular event and associated with multiple different contexts. Thus, the annotations of a user may specify an adaptive context, so that the information to be collected depends on the context of the error or event encountered. As further described, annotations are transformed into event forensics definitions, defining which context information is to be collected, and then communicated to network elements so that the network elements can automatically collect the defined context information in response to the occurrence of a particular event. The event forensics definitions can be updated when the context information is updated.

In past approaches, network management computers have lacked information sufficient to determine the root cause of a problem generally because the data collection was not done at the time of the error (a missed time opportunity), or because the data collection was done but did not include the needed commands to obtain data output, states, or configurations relevant to the error (missed context). In an embodiment, a networking system is configured to collect data according to two main characteristics. First, the networking system is directed to timeliness; event context information is collected at or around the time of the event. In an embodiment, a networking device locally collects the context information immediately after recognizing a relevant event, and reports the context information to a network management computer at the same time that an event is emitted. Second, the networking system is configured to deliver context information that is relevant and useful; as the nature of each event varies from one event to another, the context information to be collected also varies. The variation can be defined statically at development time, but also can grow dynamically as user insight grows with events experienced over time.

Figure 2:
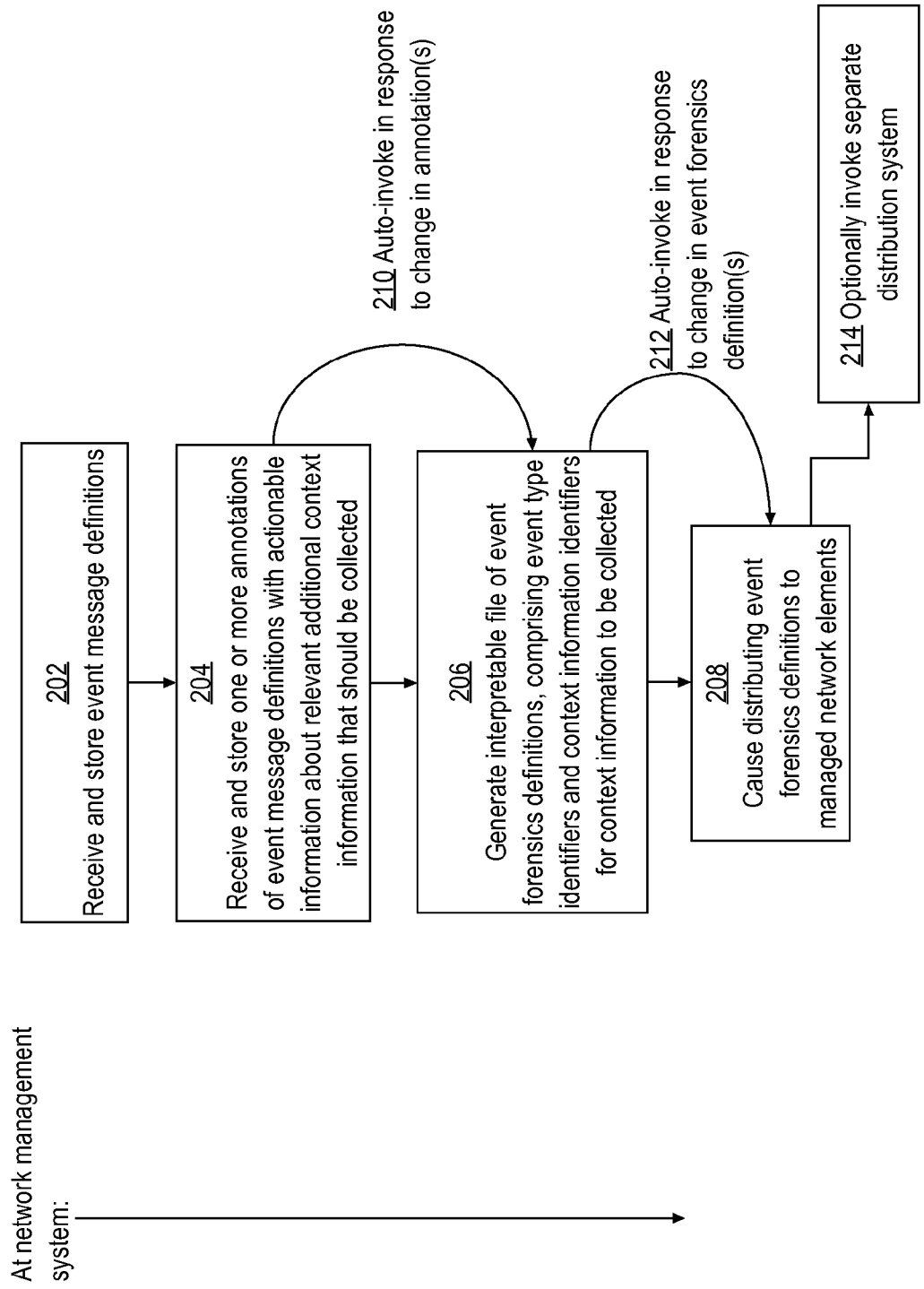
FIG. 2 illustrates annotating event message definitions.
Figure 3:
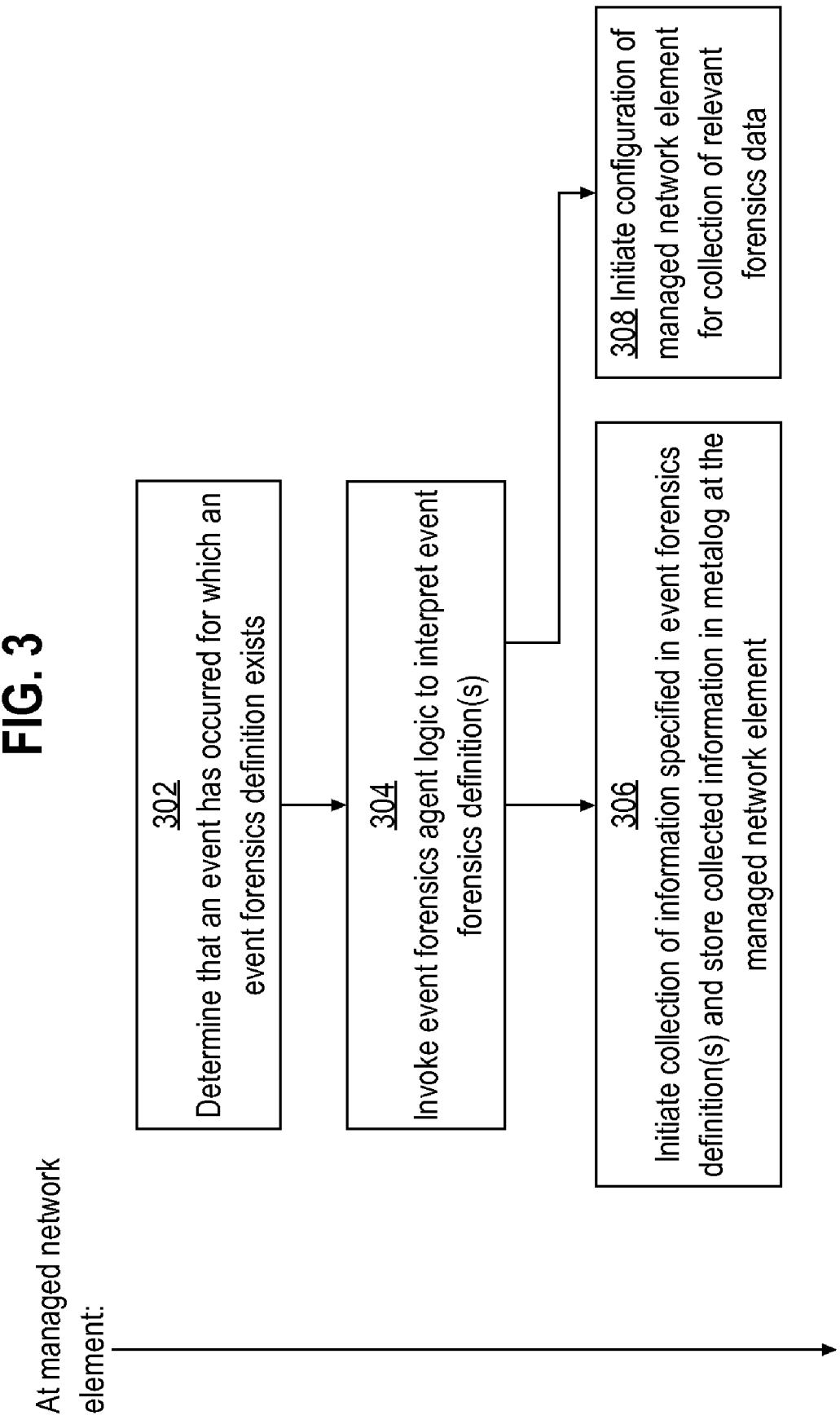
FIG. 3 illustrates collecting event context information in real time.

FIG. 1 illustrates a networking system in which an embodiment may be used; FIG. 2 illustrates annotating event message definitions; FIG. 3 illustrates collecting event context information in real time. Referring first to FIG. 1, a network management computer 102 is coupled directly or indirectly through one or more networks 130 to a managed network element 120 such as a router, switch, other networking infrastructure element, an end station device such as a printer, multifunction peripheral or computer, or other managed device.

Network management computer 102 comprises a repository 104 configured to store event definitions, for example, definitions of syslog items. In an embodiment, repository 104 is initially populated with event definitions by scanning a source, such as source code or macro definition files associated with an operating system 125 of a managed network element 120 or another internetworking element such as a router or switch. Alternatively, repository 104 may be manually updated with individual event definition records. What is important is that repository 104 acquires, in any fashion, records defining event messages that can be emitted by a managed network element 120 or by modules within the operating system 125 hosted on the managed network element.

In an embodiment, repository 104 may be implemented using Syslog Usability Tool (SUT) from Cisco Systems, Inc. The SUT, internally developed at Cisco, provides centralized management of syslog messages generated using Cisco IOS Software. The SUT is configured to extract syslog messages from IOS source code and import the messages into a registry; audit the committed syslog messages and generate exception report of those violated messages; browse existing/new syslog messages in the registry; validate existing or new syslog messages with the selected rules; manage the registration of new syslog message and modification of existing syslog message; enable the consistent review process to have informative syslog message; generate reports on existing messages, new message requests, message exceptions, message difference among different release/branches; allow administrators or developers to enter a note related to a syslog message so the information can be leveraged by others, for example, what actions needed to be done when you see this error message.

Event annotation logic 106 is coupled to the repository 104 and is configured to enable users to annotate event message definitions with actionable information about what additional context information is relevant and should be collected when those events occur. Thus, event annotation logic 106 is configured to receive advance definitions of what context information to collect at a network element when the network element is emitting a particular kind of event. Annotations specifically identify what data values to collect, what configuration commands or command-line interface (CLI) commands to invoke, or what program functions to invoke. Multiple CLI commands may be specified and stored in a list that is associated with a particular event definition. Annotations do not comprise free-form text or other non-actionable information; the annotations are capable of automatic execution at the managed network element 120.

Event annotation logic 106 is further coupled to a GUI presentation layer 103 that may be coupled to a display unit 150, such as a video monitor or a separate terminal or computer. Event annotation logic 106 cooperates with GUI presentation layer 103 to generate human-readable output and receive user input data. For example, event annotation logic 106 may be configured to generate a graphical user interface in the form of dynamically generated HTML pages that are served to an end user using an HTTP server in GUI presentation layer 103 or elsewhere in network management computer 102 for output to the display unit 150. The HTML pages may display an index or table of the event definitions in repository 104, organized according to criteria such as name or type.

Using a pointing device such as a mouse at display unit 150 or directly coupled to network management computer 102, a user may select a particular event definition and then may append one or more tags or other identifiers that indicate what context information should be collected from the networking device at the time a relevant event occurs. The context information may be any values collected or stored in a networking device that the user deems desirable or useful for the particular event. Examples include simple network management protocol (SNMP) management information base (MIB) object identifiers or names of well-known parameters that the networking device or its operating system collects in ordinary operation.

The context information may be defined at various different levels. For example, a user may specify tags or other identifiers of context information for a particular error message. Alternatively, the context information may be specified for a group of error messages, for a facility, or for all events.

As an example, assume that the selected particular event is "BGP neighbor lost." The user might specify, as additional context information, obtaining contents of access lists; interface status information (interface up/down); port on which the neighbor connection existed; neighbor node IP address; BGP neighbor configuration; TCP state and counters for the for the TCP connection corresponding to the BGP adjacency; IP traffic statistics corresponding to the BGP neighbor IP address; current top talkers or current top flows on a specified interface.

The tags or other identifiers indicating the context information are stored in repository 104 in association with a particular event definition.

Network management computer 102 further comprises event forensics definitions generator logic 108, coupled to event annotation logic 106, and configured to generate an interpretable file consisting of identifiers of event types associated with identifiers of context information that should be collected. Identifiers of event types may be message definitions that are defined in the current version of the operating system that is used in the managed network element 120.

For example, a concatenation of a facility (F) and mnemonic (M) may be used as a key to identify an event type and to index event entries in the repository 104. The identifiers of context information may comprise names of programmatic functions; pointers to invoke functions that are externally implemented in modules of the operating system of the managed network element 120; object identifiers of MIB objects; and names of configuration files that contain CLI commands or other configuration data that can be used to extract or obtain data values. In various embodiments, the interpretable file may comprise a script, an XML data file, an SGML file, etc. In an embodiment, the output file is denoted as Event Forensics Definitions file 110.

In an embodiment, distribution logic 140 is logically located in network(s) 130 and is configured to distribute event forensics definitions files 110 from network management computer 102 to managed network element 120. In a practical embodiment, there may be any number of network elements 120 coupled to networks 130, such as hundreds or thousands of network devices. Distribution logic 140 is responsible to receive distribution requests from network management computer 102, obtain a copy of an updated event forensics definitions file 110, determine which network elements 120 need to receive the definitions, and cause installation of copies in relevant network elements. For example, managed network element 120 receives and installs the event forensics definitions in local event forensics storage 132. In an embodiment, distribution logic 140 comprises Yellowdog Updater Modifier (YUM), or Package Distribution System, from Cisco Systems, Inc., San Jose, Calif. Alternatively, web services management systems may be used for distribution.

In an embodiment, a managed network element 120 comprises Event Forensics Agent Logic 122 that is configured to interpret the Event Forensics Definitions file 110. Event Forensics Agent Logic 122 is configured to cause collecting the information specified in the Event Forensics Definitions file 110 from the managed network element 120 and to write the collected information to a metalog 124. For example, Event Forensics Agent Logic 122 can automatically cause execution of one or more command-line interface (CLI) commands, or cause programmatic execution of equivalent CLI functions, or invoke shell scripts to collect and store data values from sources such as MIBs or internal operating system storage locations. In an embodiment, metalog 124 comprises a circular metalog maintained in memory that is persisted only upon request. Metalog 124 may be implemented in the manner described in U.S. Patent Publication No. 20080301506.

Further, from the interpreted Event Forensics Definitions file 110, the Event Forensics Agent Logic 122 also can take specified action to prepare the managed network element 120 for collection of relevant forensics data. For example, the Event Forensics Agent Logic 122 may re-configure or otherwise prepare the managed network element 120 so that particular event forensics data can be collected. Event Forensics Agent Logic 122 may perform such configuration or preparation by invoking separate collector configuration logic 128.

In an embodiment, managed network element 120 further comprises Event Subsystem Logic 126 that is configured to invoke the Event Forensics Agent Logic 122 when events occur for which event forensics have been defined. Thus, Event Subsystem Logic 126 is configured to detect events, determine that a detected event is associated with event forensics definitions in local event forensics storage 132, and to invoke the Event Forensics Agent Logic 122 to cause collecting the forensic event data that has been defined for the detected event.

The Event Forensics Agent Logic 122 performs data collection promptly after Event Subsystem Logic 126 recognizes an event and immediately invokes the logic 122. In certain embodiments, collection of data values may occur within milliseconds or other fractions of seconds after an event occurs in the managed network element 120. Programmatically, in an embodiment, the Event Forensics Agent Logic 122 is invoked in the context of a process that calls a logger process to add a new event to a message queue for logging or other processing. For example, a BGP process that experiences the loss of a BGP neighbor may create an event and then call an application programming interface (API) function to add the event to a message queue that is managed by a logger or other module.

An instance of Embedded Event Manager (EEM) in managed network element 120 may assist with triggering invocation of Forensics Agent Logic 122 by detecting the addition of new events to an event queue. In response, the newly added event is evaluated to determine whether matching event forensics definitions have been created for that event. If so, then specified supplemental data collection processes are triggered using CLI, invoking program functions, saving memory address contents, or other mechanisms that are identified in the event forensics definitions. Thus, Event Forensics Agent Logic 122 is effectively capable of causing collection of relevant context information in near real-time after the occurrence of an event, unlike prior approaches in which collection occurred long after an event, and occurred at a separate network management system.

Embodiments further provide the benefit of near real-time collection of event forensics data. Data is collected at the managed network element 120 at a time only shortly after an event occurs. Embodiments may be highly automated and can automatically detect relevant events and initiate collection of relevant context promptly after such detection.

In an embodiment, the Event Forensics Definitions Generator Logic 108 is automatically invoked in response to a user using Event Annotation Logic 106 to update the information that is to be collected for an event. Using distribution logic 140, the resulting Event Forensics Definition file 110 is distributed to the routers across the network. Any number of files 110 may be generated and distributed. In an embodiment, distribution of updates is triggered whenever there is an addition, change, or removal relating to the Event Forensics Definitions using the Event Annotation Logic 108.

In an embodiment, distribution of updates comprises distributing only changes to prior event forensics definitions. In an embodiment, an event forensics-specific package installer at managed network element 120 merges the change data with existing Event Forensics Definitions in local event forensics storage 132 whenever updates are received. Consequently, the Event Forensics Agent Logic 122 always operates on the latest Event Forensics Definitions.

In the preceding examples, a user of network management computer 102 defines event annotations that are subsequently distributed to a managed network element. In this context, the user of network management computer 102 is normally affiliated with an enterprise that owns or operates network 130 and managed network element, for example, in a campus network, corporate network, or other LAN-WAN environment. Alternatively, in an embodiment, the present system may be used by a vendor of managed network element 120 to push recommended or desired context information to the managed network element. Thus, the vendor might independently define and cause distributing definitions of information that the vendor wants to have collected on certain events so that the information defined in vendor databases is automatically collected in metalogs across the network whenever those events occur. This approach may assist the vendor in providing customer support or in correcting bugs or errors.

In a variation of this embodiment, the vendor may operate a fee-based service with which the vendor creates, maintains, populates, augments and prunes the knowledge of their engineers in a live knowledge base that lists the information that needs to be collected for given events. As a paid service, the information to be collected is pushed to customers, or customers pull the information from a known location, periodically. Additionally or alternatively, the information to be collected is pushed to and pulled from business partners of the vendor who support customers. Therefore, customers and the vendor's technical support center have a higher likelihood that the forensics information collected is as adaptive and as near real time as possible.

Each of the elements denoted as "logic" in FIG. 1 may be implemented in various embodiments using a computer, one or more application-specific integrated circuits (ASICs) or other digital electronic logic, one or more computer programs, modules, objects, methods, or other software elements. For example, in one embodiment network management computer 102 may comprise a special-purpose computer having particular logic configured to implement the elements and functions described herein. In an embodiment, managed network element 120 may be implemented as a special-purpose computer having particular logic configured to implement the elements and functions described herein for a managed element. In another embodiment, network management computer 102 may comprise a general purpose computer as in FIG. 4, loaded with one or more stored programs which transform the general purpose computer into a particular machine upon loading and execution.

The embodiment of FIG. 1 has no requirements that the managing system 102 is co-located with the managed system 120, and no limitations on the type of reachability or connectivity between network management computer 102 and managed network element 120. Any suitable distribution system may be used. In various embodiments, a managing system can be a specific network device (e.g., a dedicated router) set up in a network only for this purpose. Alternatively, network management computer 102 may comprise a line card with large-capacity mass storage systems within a chassis of another computer. Network management computer 102 can be a Virtual Machine (VM) hosted inside the managed network element 120 or it can be a computer process or set of processes. Network management computer 102 can comprise an external virtual managing system, reachable by the managed system through with a URI.

In an embodiment, Event Forensics Agent Logic 122 implements a dynamic or recursive context so that the context information to be collected depends on the context of the error or event that is encountered. Thus, the logic 122 is configured to dynamically and recursively evaluate context to arrive at the determination of which information to collect at which time. As a result, the metalog 124 stores dynamic context information that is gathered dynamically.

Referring now to FIG. 2, in step 202, one or more event message definitions are received and stored. For example, an administrator configures network management computer 102 with stored definitions of syslog messages, error messages, or other network event messages that the managed network element is capable of emitting.

In step 204, the process receives and stores one or more annotations of event message definitions with actionable information about relevant additional context information that should be collected. The annotations may be associated with event message definitions or with a grouping of message definitions; thus annotations can be per-event, or per-group-of-related events, for example, an event facility. The annotations may comprise tags, object identifiers, or other indications of what context information should be collected. For example, a user may associate a particular MIB variable or a particular operating system parameter with a particular event, indicating that the system should collect the value of the MIB variable or parameter when the event occurs.

In step 206, the process generates an interpretable file of event forensics definitions, comprising event type identifiers and context information identifiers for context information to be collected. In an embodiment, step 206 is automatically invoked in response to a change in an annotation, as indicated by arrow 210.

In step 208, the process causes distributing the event forensics definitions to managed network elements. In an embodiment, distribution at step 208 is invoked automatically, as indicated by arrow 212, in response to a change in one or more event forensics definitions at step 206. Step 208 optionally may involve invoking a separate distribution system, as indicated at step 214. Steps of FIG. 2 may be performed by a network management computer, for example.

Referring now to FIG. 3, in step 302 a process determines that an event has occurred for which an event forensics definition exists. For example, within a managed network element 120, an event is emitted in response to an error or other condition. The Event Subsystem Logic 126 evaluates the event based on an event identifier and determines whether matching forensics definitions are stored in local event forensics storage 132.

If so, then in step 304 the process invokes the Event Forensics Agent Logic to interpret the event forensics definitions in storage. One or more variables, values or other data elements are identified for collection. In step 306, the process initiates collection of the information that is specified in the event forensics definitions, and stores the collected information in a metalog at the managed network element. Additionally or alternatively, in step 308, the process initiates configuration of the managed network element for collection of relevant forensics data.

Embodiments provide the benefit of adaptive near-real time forensics data collection in response to errors or other system events. The timely collected forensics data and its relevance to the root cause can greatly reduce the time and effort required to perform troubleshooting, diagnostics, and analysis for the finding of the root cause to an event. Unlike past approaches, the present approach is dynamic in nature so that the system evolves with the knowledge that is learned from supporting the network, through the use of annotation of events. Further, the system is adaptive, as the way to collect forensics data can change as long as such knowledge was updated at the managing station and pushed via the distribution system.

Further, a particular collection operation may involve evaluating the current context to arrive at the determination of which information to collect and when. In context processing, managed network element 120 first determines what actions to perform, which indicate interesting context, and then performs the actions to gather context information.] Actions executed according to event forensics definitions may affect subsequent collection actions or the logic that implements a subsequent collection action. For example, an information value collected in a first collection action can affect the next collection action.

Embodiments are scalable as they can be hierarchically distributed, and embodiments are flexible and easily modified. There is no need to stop operation of network management computer 102 or managed network element 120 to accomplish adaptive improvement about how event forensics data is collected. Instead, Event Annotation Logic 106 is simply used to create updated event definition annotations, automatically triggering the Event Forensics Definitions Generator Logic 108 to generate an updated event forensics definitions file 110, which is distributed to managed network element 120 and integrated into its operations automatically. In response to an update, the Event Forensics Agent Logic 122 seamlessly adapts to the forensics data collection specified in the update.

In an embodiment, annotations are received in initially static form from an end user or vendor of a network element. Thereafter, a user can change the annotations, causing updates to be conveyed to the network element so that the network element starts collecting the new, updated type of information instead of the previous one. Further, a user can activate or deactivate the forensics collection for the data that is specified of interest, or selectively turn it on. Therefore, an event definition could specify that for a particular type of event certain statistics should be collected and an operator could additionally mark one or more statistics as deactivated, or mark the statistics for collection only at a particular time, for example, when the operator is scrutinizing the service level of a service that is associated with a particular event.

In an embodiment, dynamic content changes to event forensics definitions can be uploaded to particular network devices automatically using Package Distribution System or other means. In an embodiment, the system provides an editing tool with which the user can perform modification, activation, or deactivation of forensic actions. In an embodiment, uploaded configuration files comprise formatted data-driven action instructions with conditional checks on certain threshold crossing values for triggering further actions.

As an example, a configuration file may have the following contents:
% FAC-3-MNE
Enable Sev3;
Must; CLI1;
Var1 GT value1; CLI2;
Var2 LT value2; CLI3;
This example may be interpreted as follows:
When the underlying event happens,
Enable this forensic action if this CPOL feature is enabled for Sev3 or lower (i.e. more serious).
Must execute CLI1;
Parse the output from CLI1 to get Var1 and Var2;
If Var1 is greater than value1, then execute CLI2;
If Var2 is less than value2, then execute CLI3.

3.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
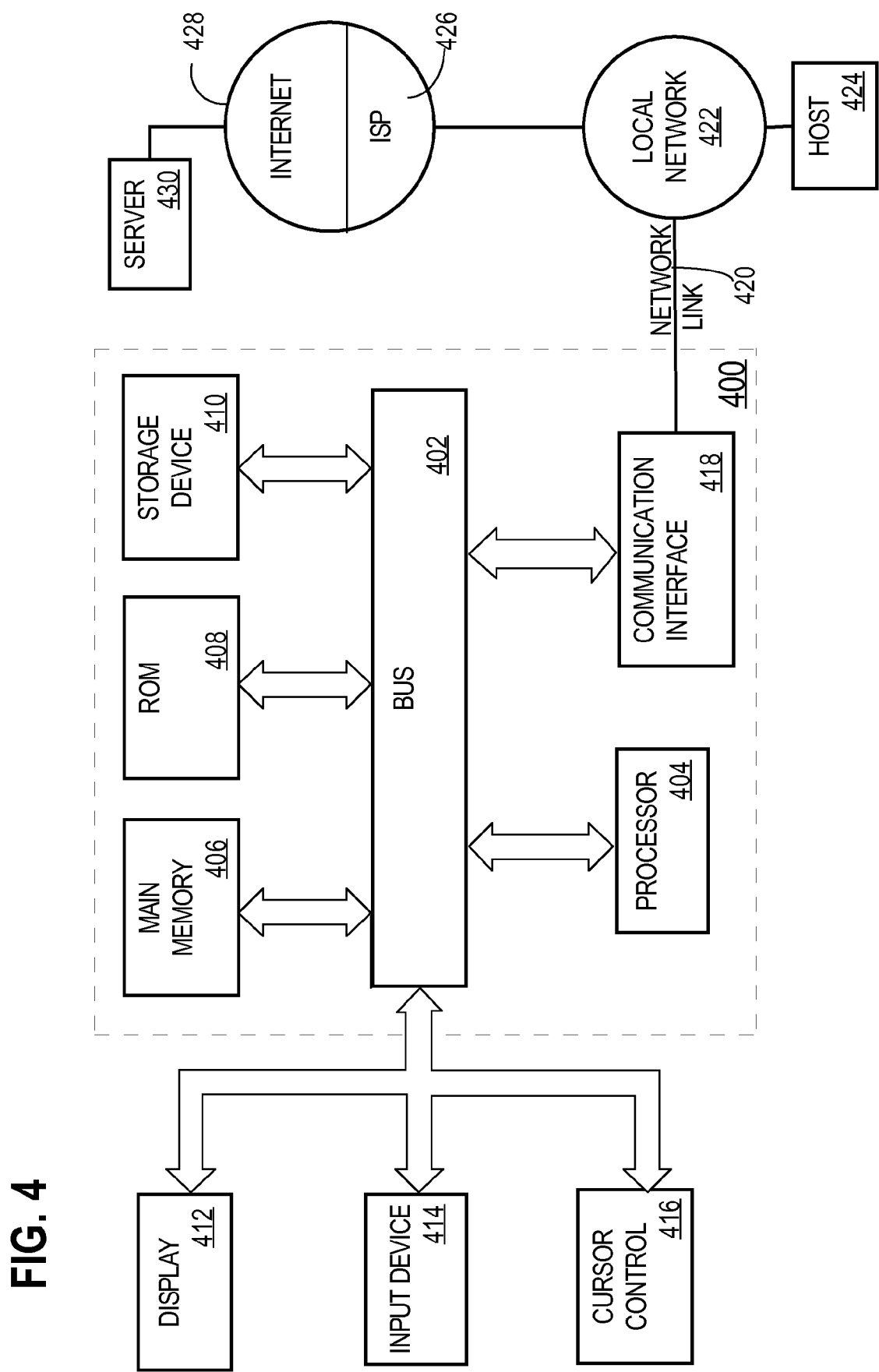
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

4.0 Extensions and Alternatives

In the foregoing specification, embodiments of the invention have been described with reference to numerous specific details that may vary from implementation to implementation. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system, comprising:
   a data repository configured to store a plurality of event message definitions for error messages, syslog messages, or other notification messages that may be obtained from one or more managed network elements;
   event annotation logic coupled to the data repository and configured to receive and store one or more annotations to each of the event message definitions, wherein each of the annotations specifies event context information to be collected in response to an associated event message and to be collected when an event indicated in the associated event message occurs;
   event forensics definitions generator logic coupled to the event annotation logic and configured to generate an event forensics definitions file capable of interpretation by the one or more managed network elements and comprising event type identifiers and context information identifiers for context information to be collected, and configured to cause distributing the event forensics definitions file to the one or more managed network elements before events occur.

2. The system of claim 1, further comprising, in each of the managed network elements:
   local event forensics storage configured to receive and store the event forensics definitions file;
   an event subsystem configured to detect creation of a particular event message, and in response to the detecting, immediately thereafter: to determine whether the event forensics definitions file defines event context information for that particular event message, and in response, to invoke event forensics agent logic to cause collecting the specified context information and to store the specified context information at the managed network element.

3. The system of claim 2, wherein the event forensics agent logic is configured to store the specified context information in a circular metalog at the managed network element.

4. The system of claim 2, wherein context information identifiers comprise any of command-line interface (CLI) commands, operating system function names, simple network management protocol (SNMP) management information base (MIB) object identifiers, and XML data conforming to an XML data model.

5. The system of claim 2, wherein the event forensics agent logic is configured to initiate re-configuration of the managed network element for collection of the context information in response to changes in one or more event forensics definitions in the data repository, or in response to an activation or deactivation of the event context information.

6. A computer-implemented method, comprising:
   receiving and storing one or more event message definitions for error messages, syslog messages, or other notification messages that may be obtained from one or more managed network elements;
   receiving and storing one or more annotations to each of the event message definitions, wherein each of the annotations specifies event context information to be collected in response to an associated event message and to be collected when an event indicated in the associated event message occurs;
   automatically generating, in response to the storing the one or more annotations, an event forensics definitions file capable of interpretation by the one or more managed network elements and comprising event type identifiers and context information identifiers for context information to be collected;
   causing distributing the event forensics definitions file to the one or more managed network elements before events occur.

7. The method of claim 6, further comprising, at a managed network element:
   receiving and storing the event forensics definitions file;
   detecting creation of a particular event message;
   in response to the detecting, immediately thereafter: determining whether the event forensics definitions file defines event context information for that particular event message; in response to the determining, causing collecting the specified context information and storing the specified context information at the managed network element.

8. The method of claim 7, further comprising storing the specified context information in a circular metalog at the managed network element.

9. The method of claim 7, wherein the context information identifiers comprise any of command-line interface (CLI) commands, operating system function names, simple network management protocol (SNMP) management information base (MIB) object identifiers, and XML data conforming to an XML data model.

10. The method of claim 7, further comprising initiating re-configuration of the managed network element for collection of the context information in response to changes in one or more event forensics definitions in the data repository, or in response to an activation or deactivation of the event context information.

11. A data processing system, comprising:
one or more processors;
means for receiving and storing one or more event message definitions for error messages, syslog messages, or other notification messages that may be obtained from one or more managed network elements;
means for receiving and storing one or more annotations to each of the event message definitions, wherein each of the annotations specifies event context information to be collected in response to an associated event message and to be collected when an event indicated in the associated event message occurs;
means for automatically generating, in response to the storing the one or more annotations, an event forensics definitions file capable of interpretation by the one or more managed network elements and comprising event type identifiers and context information identifiers for context information to be collected;
means for causing distributing the event forensics definitions file to the one or more managed network elements before events occur.

12. The system of claim 11, further comprising, at a managed network element:
means for receiving and storing the event forensics definitions file;
means for detecting creation of a particular event message;
means for determining, in response to the detecting, and immediately thereafter, whether the event forensics definitions file defines event context information for that particular event message; in response to the determining, causing collecting the specified context information and storing the specified context information at the managed network element.

13. The system of claim 12, further comprising means for storing the specified context information in a circular metalog at the managed network element.

14. The system of claim 12, wherein the context information identifiers comprise any of command-line interface (CLI) commands, operating system function names, simple network management protocol (SNMP) management information base (MIB) object identifiers, and XML data conforming to an XML data model.

15. The system of claim 12, further comprising means for initiating re-configuration of the managed network element for collection of the context information in response to changes in one or more event forensics definitions in the data repository, or in response to an activation or deactivation of the event context information.

16. A computer-readable storage medium storing one or more sequences of instructions which when executed by one or more processors, cause the one or more processors to perform:
receiving and storing one or more event message definitions for error messages, syslog messages, or other notification messages that may be obtained from one or more managed network elements;
receiving and storing one or more annotations to each of the event message definitions, wherein each of the annotations specifies event context information to be collected in response to an associated event message and to be collected when an event indicated in the associated event message occurs;
automatically generating, in response to the storing the one or more annotations, an event forensics definitions file capable of interpretation by the one or more managed network elements and comprising event type identifiers and context information identifiers for context information to be collected;
causing distributing the event forensics definitions file to the one or more managed network elements before events occur.

17. The computer-readable storage medium of claim 16, further comprising instructions which when executed at a managed network element cause:
receiving and storing the event forensics definitions file;
detecting creation of a particular event message;
in response to the detecting, immediately thereafter: determining whether the event forensics definitions file defines event context information for that particular event message; in response to the determining, causing collecting the specified context information and storing the specified context information at the managed network element.

18. The computer-readable storage medium of claim 17, further comprising instructions which when executed at the managed network element cause storing the specified context information in a circular metalog at the managed network element.

19. The computer-readable storage medium of claim 17, wherein the context information identifiers comprise any of command-line interface (CLI) commands, operating system function names, simple network management protocol (SNMP) management information base (MIB) object identifiers, and XML data conforming to an XML data model.

20. The computer-readable storage medium of claim 17, further comprising instructions which when executed at the managed network element cause initiating re-configuration of the managed network element for collection of the context information in response to changes in one or more event forensics definitions in the data repository, or in response to an activation or deactivation of the event context information.

* * * * *